US011140572B2

(12) United States Patent
Cho et al.

(10) Patent No.: US 11,140,572 B2
(45) Date of Patent: Oct. 5, 2021

(54) METHOD FOR TRANSMITTING UL PACKET BASED ON QUALITY OF SERVICE (QOS) FRAMEWORK IN WIRELESS COMMUNICATION SYSTEM AND A DEVICE THEREFOR

(71) Applicant: LG Electronics Inc., Seoul (KR)

(72) Inventors: Heejeong Cho, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 16/496,315

(22) PCT Filed: Mar. 20, 2018

(86) PCT No.: PCT/KR2018/003227
§ 371 (c)(1),
(2) Date: Sep. 20, 2019

(87) PCT Pub. No.: WO2018/174521
PCT Pub. Date: Sep. 27, 2018

(65) Prior Publication Data
US 2020/0037197 A1 Jan. 30, 2020

Related U.S. Application Data

(60) Provisional application No. 62/474,626, filed on Mar. 22, 2017.

(51) Int. Cl.
*H04J 3/16* (2006.01)
*H04W 28/02* (2009.01)
(Continued)

(52) U.S. Cl.
CPC ... *H04W 28/0268* (2013.01); *H04W 28/0263* (2013.01); *H04W 76/30* (2018.02); *H04W 80/08* (2013.01)

(58) Field of Classification Search
None
See application file for complete search history.

(56) References Cited

U.S. PATENT DOCUMENTS 10,841,933 B2* 11/2020 Hapsari ............... H04W 28/24
2010/0182912 A1* 7/2010 Hongisto ............ H04L 47/743
370/242
(Continued)

FOREIGN PATENT DOCUMENTS

KR 20160028446 3/2016

OTHER PUBLICATIONS

Ericsson, Nokia, ZTE, AT&T, "[23.501] Cleanup of QoS framework description," S2-171623, SA WG2 Meeting #119, Dubrovnik, Croatia, dated Feb. 13-17, 2017, 9 pages, XP051240840.
(Continued)

*Primary Examiner* — Kwang B Yao
*Assistant Examiner* — Juvena W Loo
(74) *Attorney, Agent, or Firm* — Fish & Richardson P.C.

(57) ABSTRACT

The present invention relates to a wireless communication system and a method and a device for transmitting uplink data packet based on QoS framework in wireless communication system, the method comprising: receiving uplink (UL) packet with a first QoS flow ID from an upper layer; checking whether the first QoS flow ID is prohibited or not based on QoS flow prohibition information; and determining whether to transmit the UL packet according to result of checking; wherein the UL packet of the first QoS flow ID is not transmitted if the first QoS flow ID is prohibited; and wherein the UL packet with the first QoS flow ID is transmitted to a network via a DRB, if the first QoS flow is not prohibited. The UE is capable of communicating with at least one of another UE, a UE related to an autonomous driving vehicle, a base station or a network.

10 Claims, 15 Drawing Sheets

(51) Int. Cl.
*H04W 76/30* (2018.01)
*H04W 80/08* (2009.01)

(56) References Cited

U.S. PATENT DOCUMENTS

| | | | | |
|---|---|---|---|---|
| 2012/0198081 A1* | 8/2012 | Zhao | ............... | H04L 47/767 |
| | | | | 709/227 |
| 2016/0344635 A1* | 11/2016 | Lee | ............... | H04L 47/20 |
| 2017/0339568 A1* | 11/2017 | Wang | ............... | H04W 72/082 |
| 2018/0146398 A1* | 5/2018 | Kim | ............... | H04W 80/02 |
| 2018/0192426 A1* | 7/2018 | Ryoo | ............... | H04W 72/085 |
| 2018/0213540 A1* | 7/2018 | Chiu | ............... | H04W 28/02 |
| 2019/0075482 A1* | 3/2019 | Eriksson | ............... | H04W 76/27 |
| 2019/0230693 A1* | 7/2019 | Li | ............... | H04W 72/0493 |
| 2019/0253918 A1* | 8/2019 | Liu | ............... | H04W 40/06 |
| 2019/0268824 A1* | 8/2019 | Kubota | ............... | H04W 28/0289 |
| 2019/0394685 A1* | 12/2019 | Sharma | ............... | H04W 36/0055 |
| 2020/0029241 A1* | 1/2020 | Maeder | ............... | H04L 67/141 |
| 2020/0145884 A1* | 5/2020 | Guo | ............... | H04L 12/1407 |
| 2020/0213894 A1* | 7/2020 | Agiwal | ............... | H04W 28/0263 |

OTHER PUBLICATIONS

Extended European Search Report in European Application No. 18770225.3, dated Sep. 21, 2020, 14 pages.

Huawei, HiSilicon, "Reflective QoS and Reflective ORB Mapping," R2-1700087, 3GPP TSG-RAN2 NR Ad Hoc, Spokane, Washington, USA, dated Jan. 17-19, 2017, 4 pages, XP051203839.

Huawei, HiSilicon, "QoS Flow to DRB Mapping", R2-1701205, 3GPP TSG-RAN2 Meeting #97, Athens, Greece, Feb. 13-17, 2017, 6 pages.

LG Electronics Inc., "Configurability for QoS flow ID attachment", R2-1701962, 3GPP TSG-RAN2 Meeting #97, Athenes, Greece, Feb. 13-17, 2017, 2 pages.

PCT International Search Report and Written Opinion in International Application No. PCT/KR2018/003227, dated Jun. 22, 2018, 12 pages.

Samsung, "Handling of a new QoS flow for DL and UL directions", R2-1701285, 3GPP TSG-RAN WG2 Meeting #97, Athens, Greece, Feb. 13-17, 2017, 4 pages.

ZTE, ZTE Microelectronics, "Further discussion on the new Up protocol layer for QoS", R2-1701119, 3GPP TSG-RAN WG2 Meeting #97, Athens, Greece, Feb. 13-17, 2017, 7 pages.

EP Office Action in European Appln. No. 18770225.3, dated Jun. 21, 2021, 11 pages.

Ericsson, "23.501: Cleanup of QoS framework description," S2-171755, SA WG2 Meeting #120, Busan, Korea, dated Mar. 27-31, 2017, 12 pages.

* cited by examiner (a) Control-Plane Protocol Stack (b) User-Plane Protocol Stack (a) Control-Plane Protocol Stack (b) User-Plane Protocol Stack

METHOD FOR TRANSMITTING UL PACKET BASED ON QUALITY OF SERVICE (QOS) FRAMEWORK IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/003227, filed on Mar. 20, 2018, which claims the benefit of U.S. Provisional Application No. 62/474,626, filed on Mar. 22, 2017. The disclosures of the prior applications are incorporated by reference in their entirety.

TECHNICAL FIELD

The present invention relates to a wireless communication system and, more particularly, to a method for transmitting UL packets based on QoS framework in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for transmitting UL packets based on QoS framework in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

This invention relates to a method and apparatus for prohibition of UL packet transmission of one or more QoS flows. Only if it is not prohibited, the UE maps that packet to either a DRB defined by the QoS flow-to-DRB mapping rule or a default DRB, and then transmits the packet to NG-RAN via the DRB.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
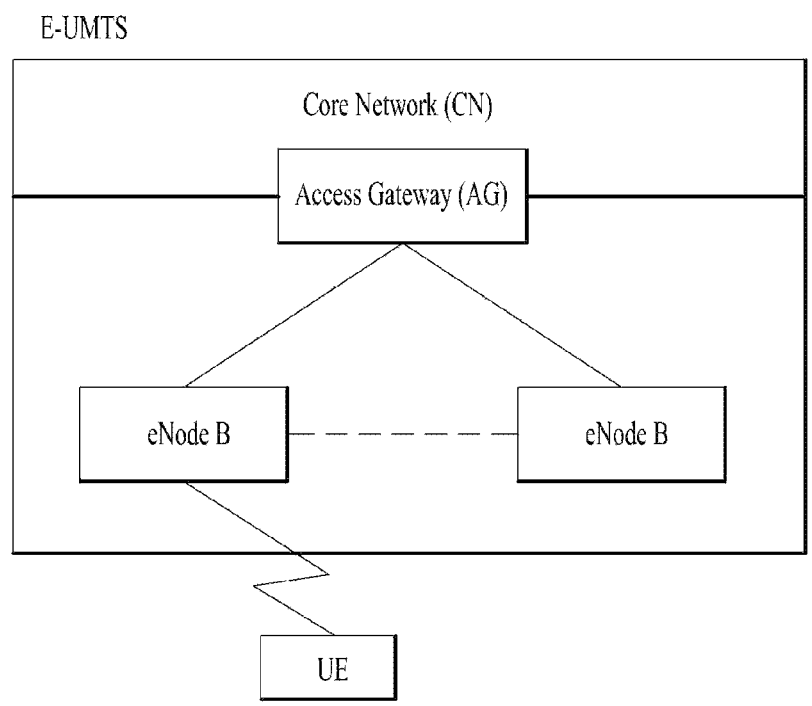
FIG. 1 is a diagram showing a network structure of an Evolved Universal Mobile Telecommunications System (E-UMTS) as an example of a wireless communication system.
Figure 2A:
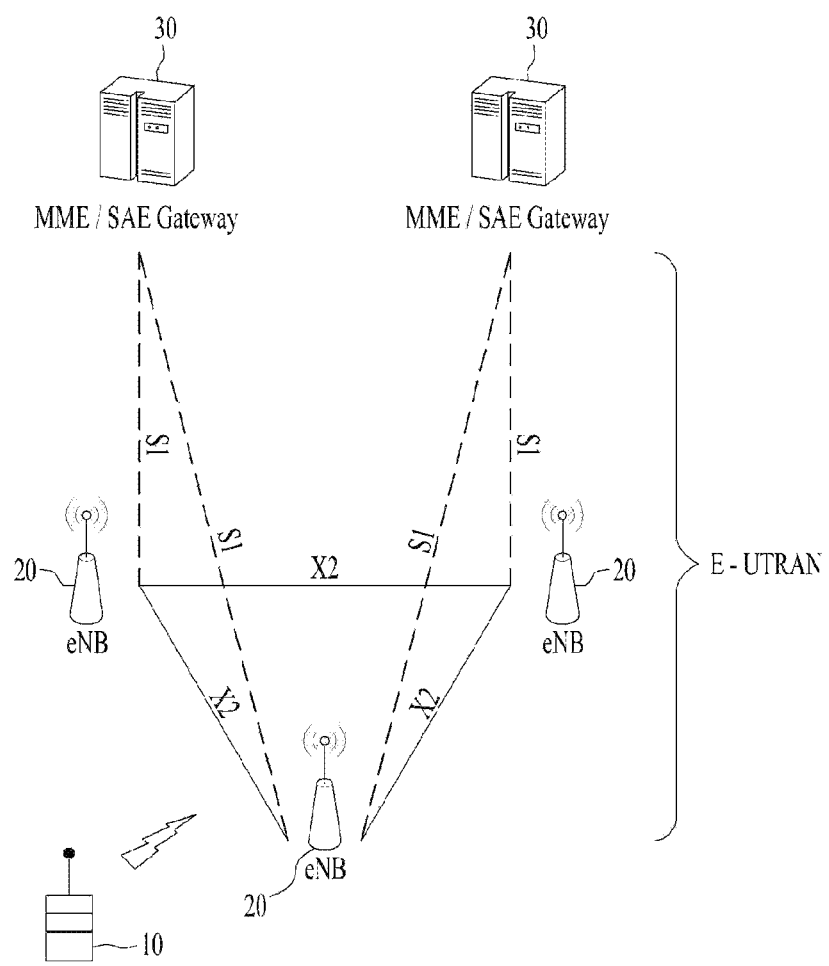
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
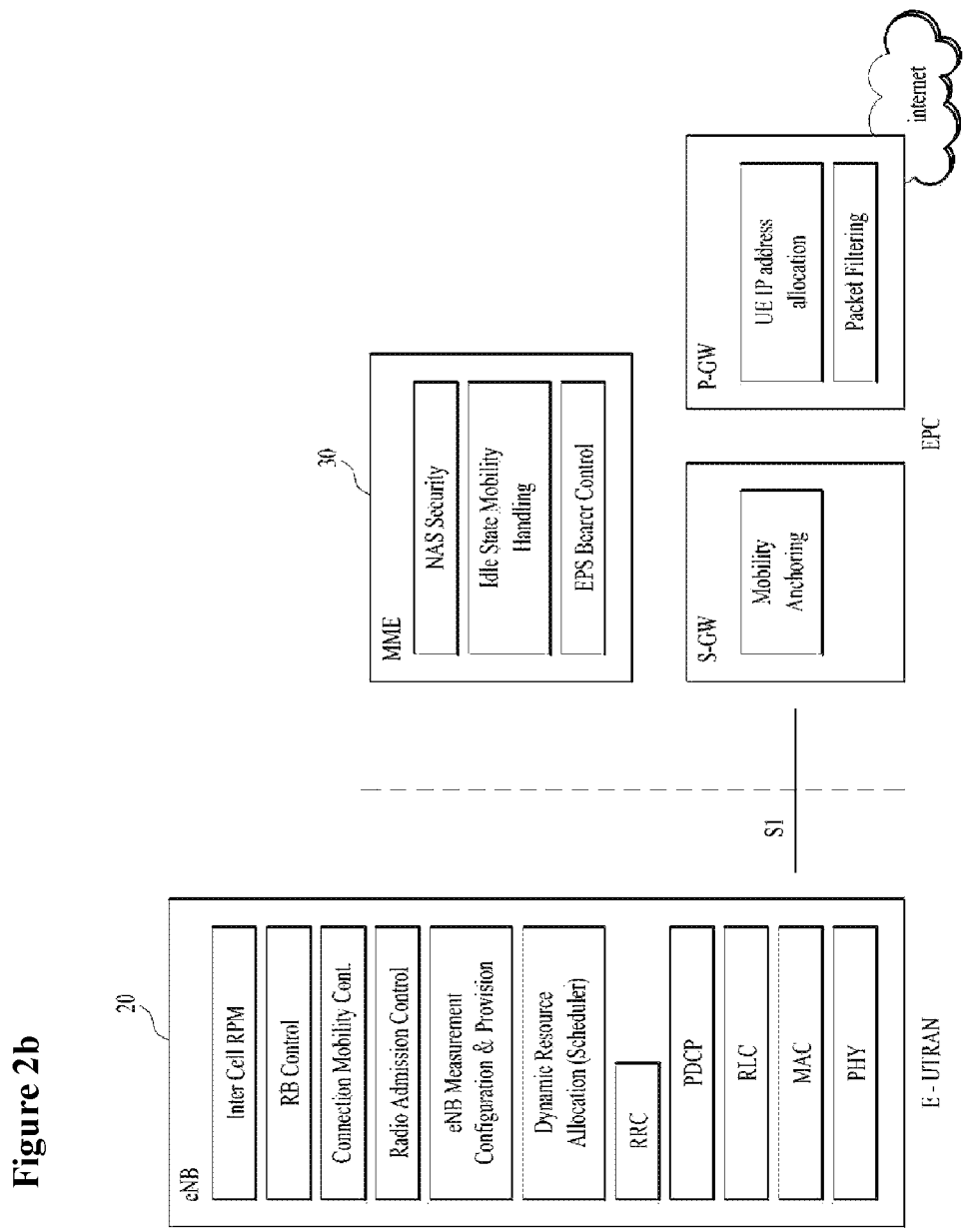
FIG. 2b is a block diagram depicting architecture of a typical E-UTRAN and a typical EPC.

FIG. 2b is a block diagram depicting architecture of a typical E-UTRAN and a typical EPC.

As illustrated in FIG. 2b, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
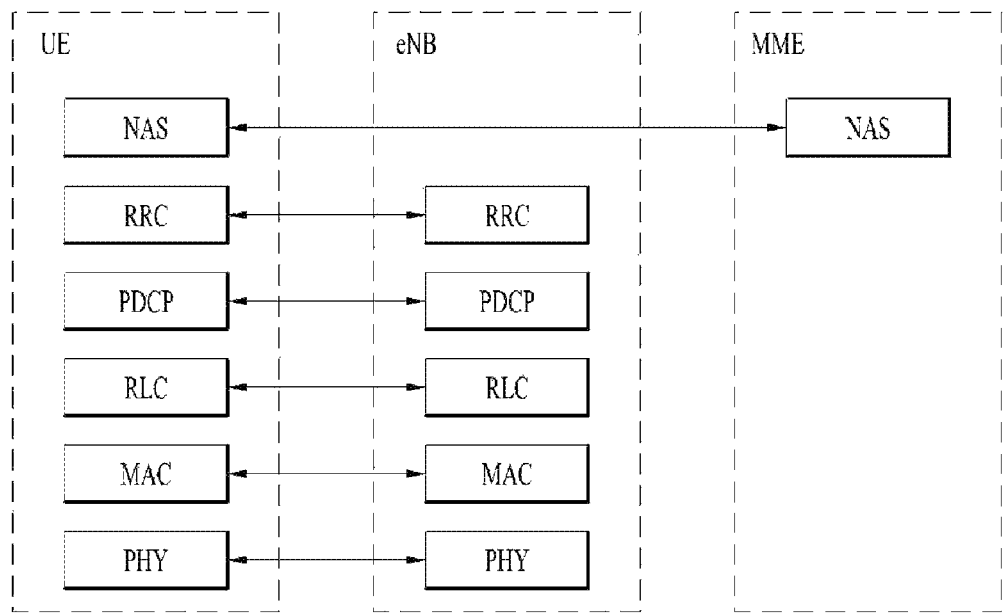
FIG. 3 is a diagram showing a control plane and a user plane of a radio interface protocol between a UE and an E-UTRAN based on a 3rd generation partnership project (3GPP) radio access network standard.
Figure 3:
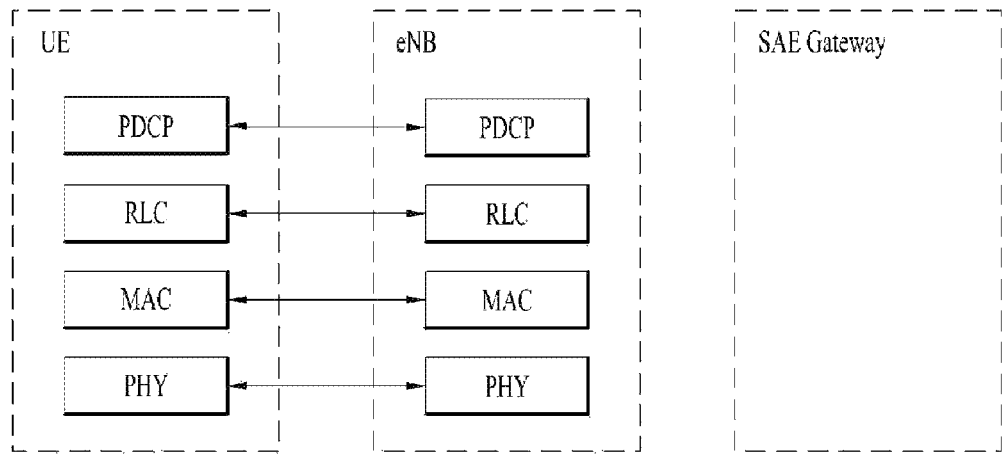

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
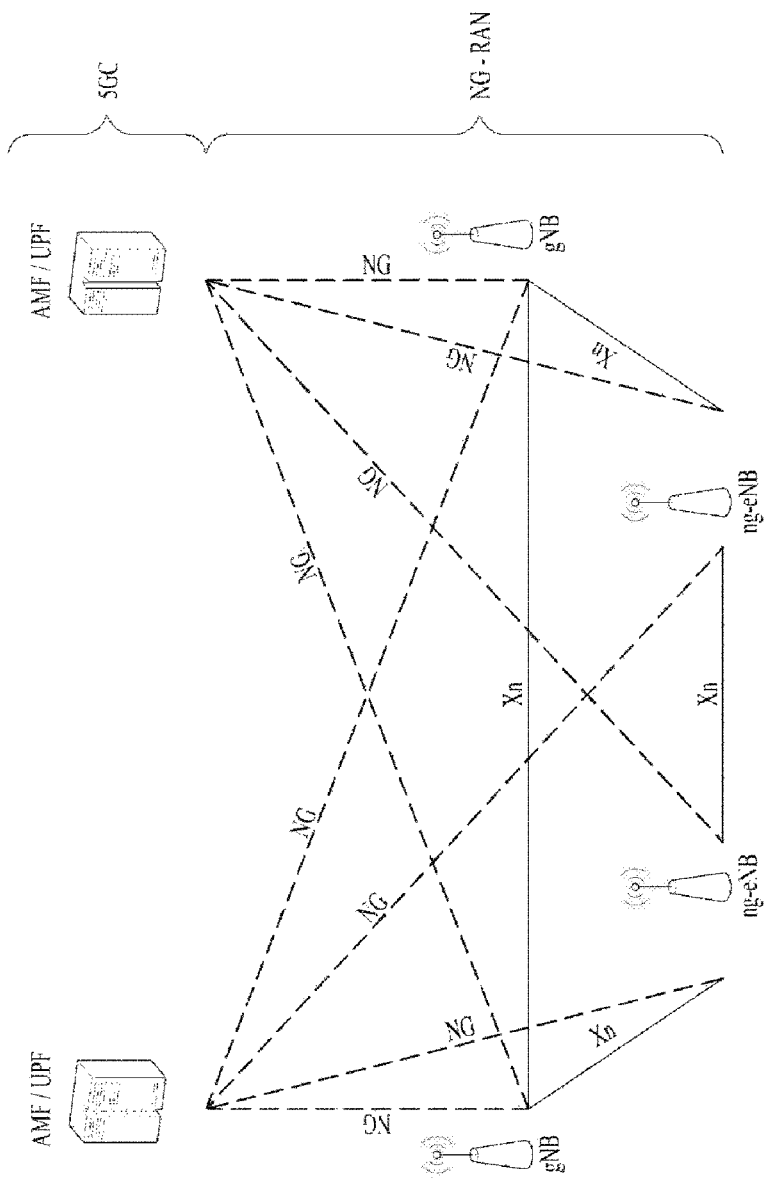
FIG. 4a is a block diagram illustrating network structure of NG Radio Access Network (NG-RAN) architecture.
Figure 4B:
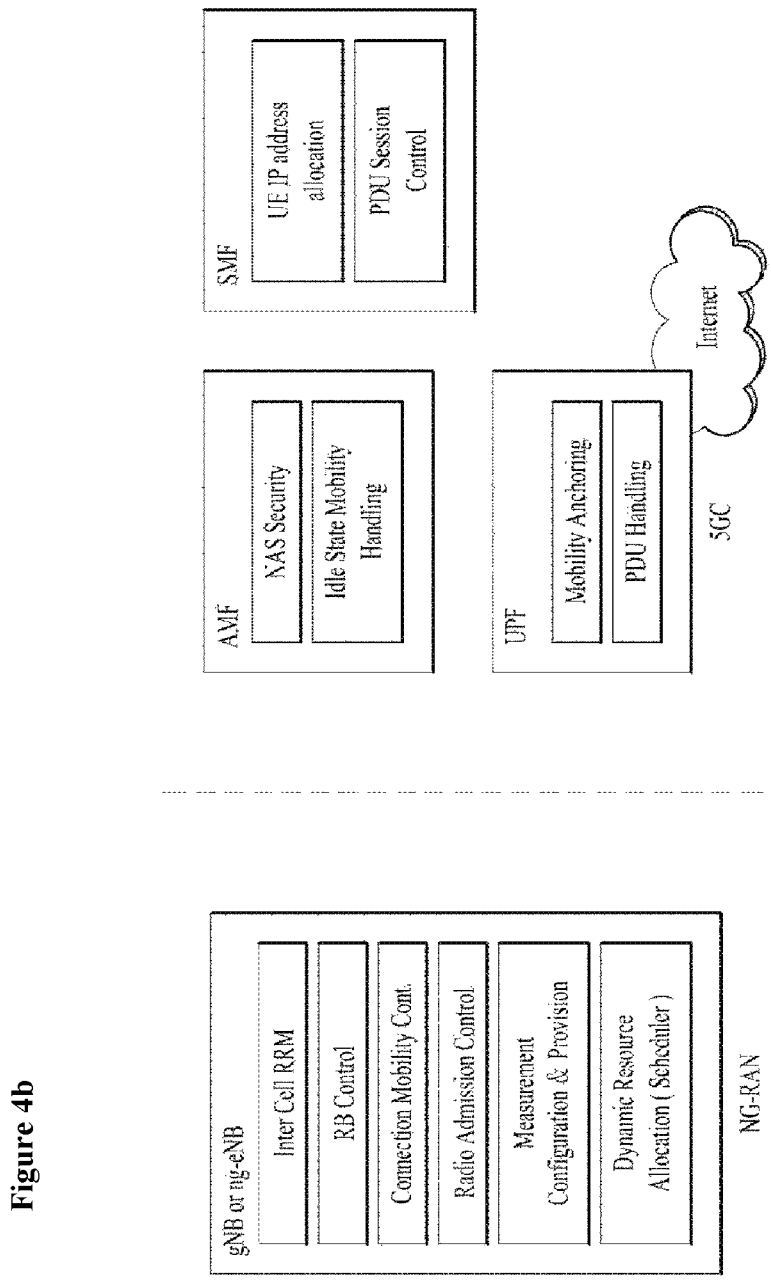
FIG. 4b is a block diagram depicting architecture of functional Split between NG-RAN and 5G Core Network (5GC)

FIG. 4*a* is a block diagram illustrating network structure of NG Radio Access Network (NG-RAN) architecture, and FIG. 4*b* is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
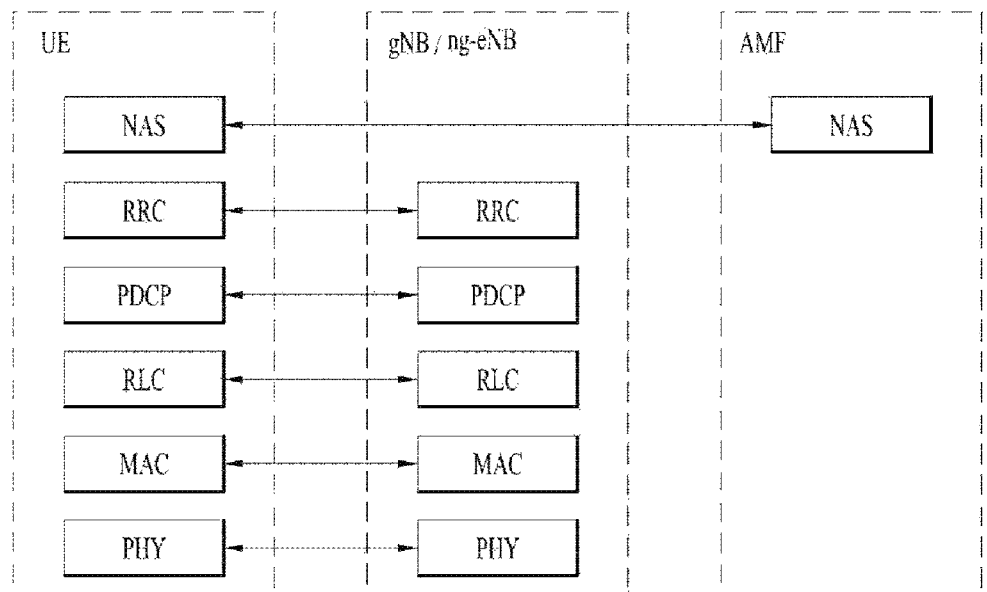
FIG. 5 is a diagram showing a control plane and a user plane of a radio interface protocol between a UE and a NG-RAN based on a 3rd generation partnership project (3GPP) radio access network standard.
Figure 5:
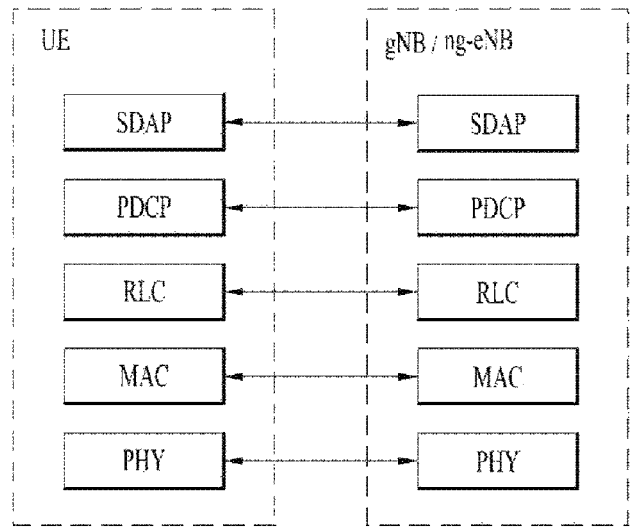

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
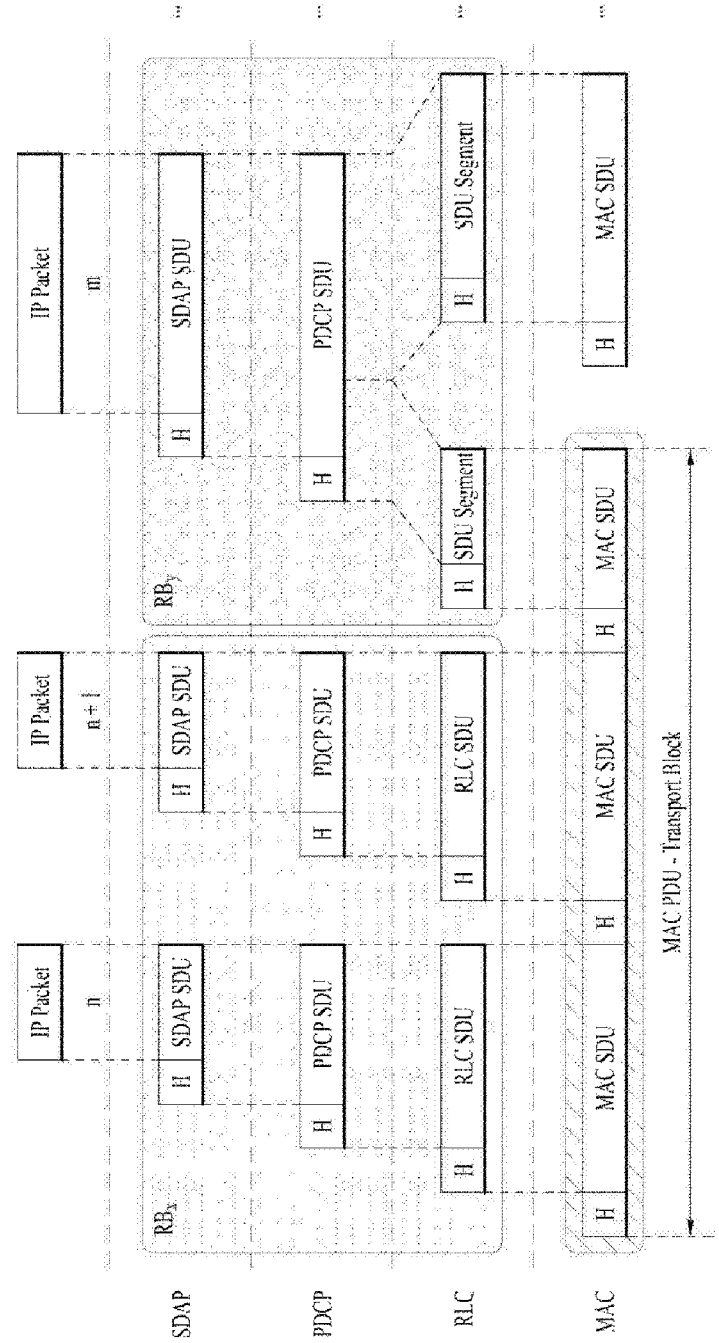
FIG. 6 is an example for L2 data flow between a UE and a NG-RAN.

FIG. 6 is an example for L2 data flow between a UE and a NG-RAN.

An example of the Layer 2 Data Flow is depicted on FIG. 6, where a transport block is generated by MAC by concatenating two RLC PDUs from RBx and one RLC PDU from RBy. The two RLC PDUs from RBx each corresponds to one IP packet (n and n+1) while the RLC PDU from RBy is a segment of an IP packet (m).

Figure 7:
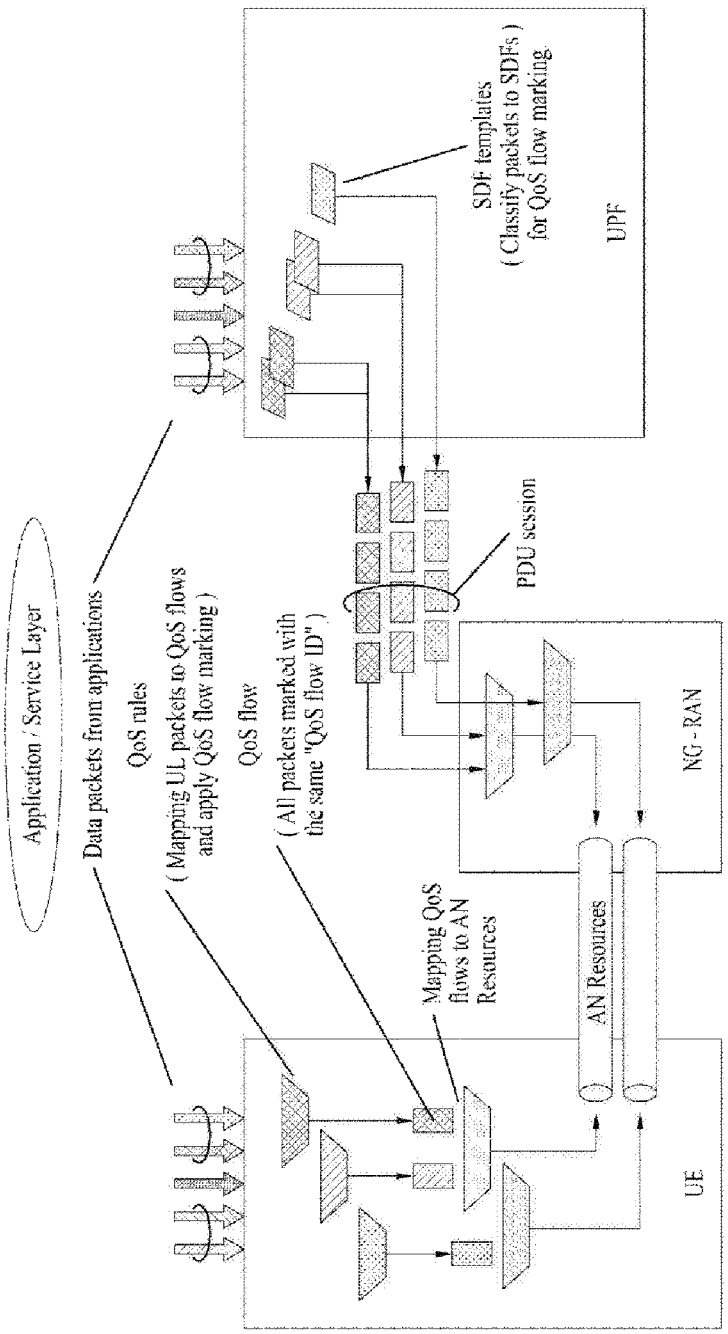
FIG. 7 is a diagram for classification and user plane marking for QoS flows and mapping to NG-RAN resources.

FIG. 7 is a diagram for classification and user plane marking for QoS flows and mapping to NG-RAN resources.

The 5G QoS model is based on QoS flows. The 5G QoS model supports both QoS flows that require guaranteed flow bit rate (GBR QoS flows) and QoS flows that do not require guaranteed flow bit rate (non-GBR QoS flows). The 5G QoS model also supports reflective QoS.

The QoS flow is the finest granularity of QoS differentiation in the PDU session. A QoS Flow ID (QFI) is used to identify a QoS flow in the 5G System. User plane traffic with the same QFI within a PDU Session receives the same traffic forwarding treatment (e.g. scheduling, admission threshold). The QFI is carried in an encapsulation header on N3 (and N9) i.e. without any changes to the e2e packet header. QFI shall be used for all PDU session types. The QFI shall be unique within a PDU session. The QFI may be dynamically assigned or may be equal to the 5QI.

Within the 5G System, a QoS flow is controlled by the SMF and may be preconfigured, or established via the PDU Session Establishment procedure, or the PDU Session Modification procedures.

Any QoS flow is characterized by: i) a QoS profile provided by the SMF to the NG-RAN via the AMF over the N2 reference point or preconfigured in the NG-RAN, ii) one or more QoS rule(s) which can be provided by the SMF to the UE via the AMF over the N1 reference point and/or derived by the UE by applying reflective QoS control, and iii) one or more SDF templates provided by the SMF to the UPF.

The UE performs the classification and marking of UL user plane traffic, i.e. the association of UL traffic to QoS flows, based on QoS rules. These QoS rules may be explicitly provided to the UE (using the PDU Session Establishment/Modification procedure), pre-configured in the UE or implicitly derived by UE by applying reflective QoS.

Reflective QoS enables the UE to map UL user plane traffic to QoS flows by creating UE derived QoS rules in the UE based on the received DL traffic.

A QoS rule contains a QoS rule identifier which is unique within the PDU session, the QFI of the associated QoS flow and a packet filter set for UL and optionally for DL and a precedence value. Additionally, for a dynamically assigned QFI, the QoS rule contains the QoS parameters relevant to the UE (e.g. 5QI, GBR and MBR and the Averaging Window). There can be more than one QoS rule associated with the same QoS Flow (i.e. with the same QFI)

A default QoS rule is required for every PDU Session and associated with the QoS flow of the default QoS rule. The principle for classification and marking of user plane traffic and mapping of QoS flows to NG-RAN resources is illustrated in FIG. 7.

In DL, incoming data packets are classified by the UPF based on SDF templates according to their SDF precedence, (without initiating additional N4 signaling). The UPF conveys the classification of the user plane traffic belonging to a QoS flow through an N3 (and N9) user plane marking using a QFI. The NG-RAN binds QoS flows to NG-RAN resources (i.e. Data Radio Bearers). There is no strict 1:1 relation between QoS flows and NG-RAN resources. It is up to the NG-RAN to establish the necessary NG-RAN resources that QoS flows can be mapped to.

In UL, the UE evaluates UL packets against the packet filter set in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS flow.

Figure 8:
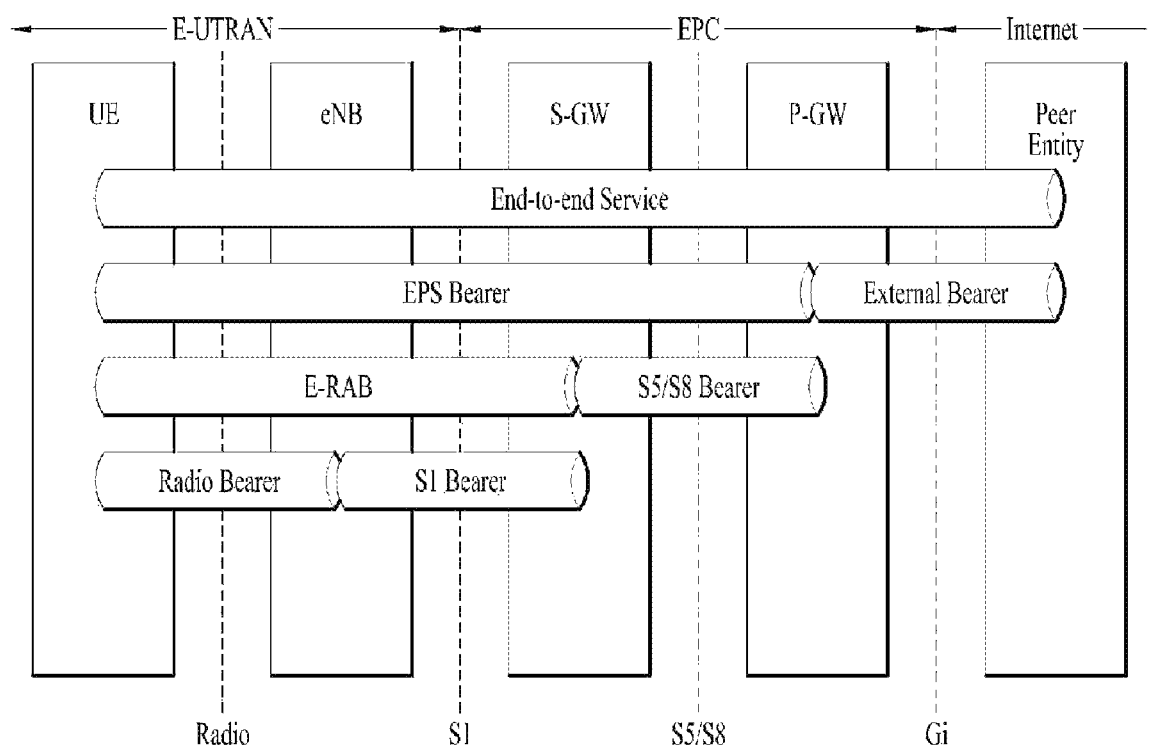
FIG. 8 is a conceptual diagram for EPS bearer service architecture in LTE (E-UTRAN) system.

FIG. 8 is a conceptual diagram for EPS bearer service architecture in LTE (E-UTRAN) system.

In the EPC/E-UTRAN, an EPS bearer/E-RAB is the level of granularity for bearer level QoS control and multiple SDFs (Service Data Flow) can be multiplexed onto the same EPS bearer by UE's TFT (Traffic Flow Template) or P-GW's TFT. As shown in the FIG. 8, an E-RAB transports the packets of an EPS bearer between the UE and the EPC. When an E-RAB exists, there is a one-to-one mapping between this E-RAB and an EPS bearer. A data radio bearer transports the packets of an EPS bearer between a UE and one or more eNB(s). When a data radio bearer exists, there is a one-to-one mapping between this data radio bearer and the EPS bearer/E-RAB. Therefore, data flows to RB mapping does not change during the handover.

Figure 9:
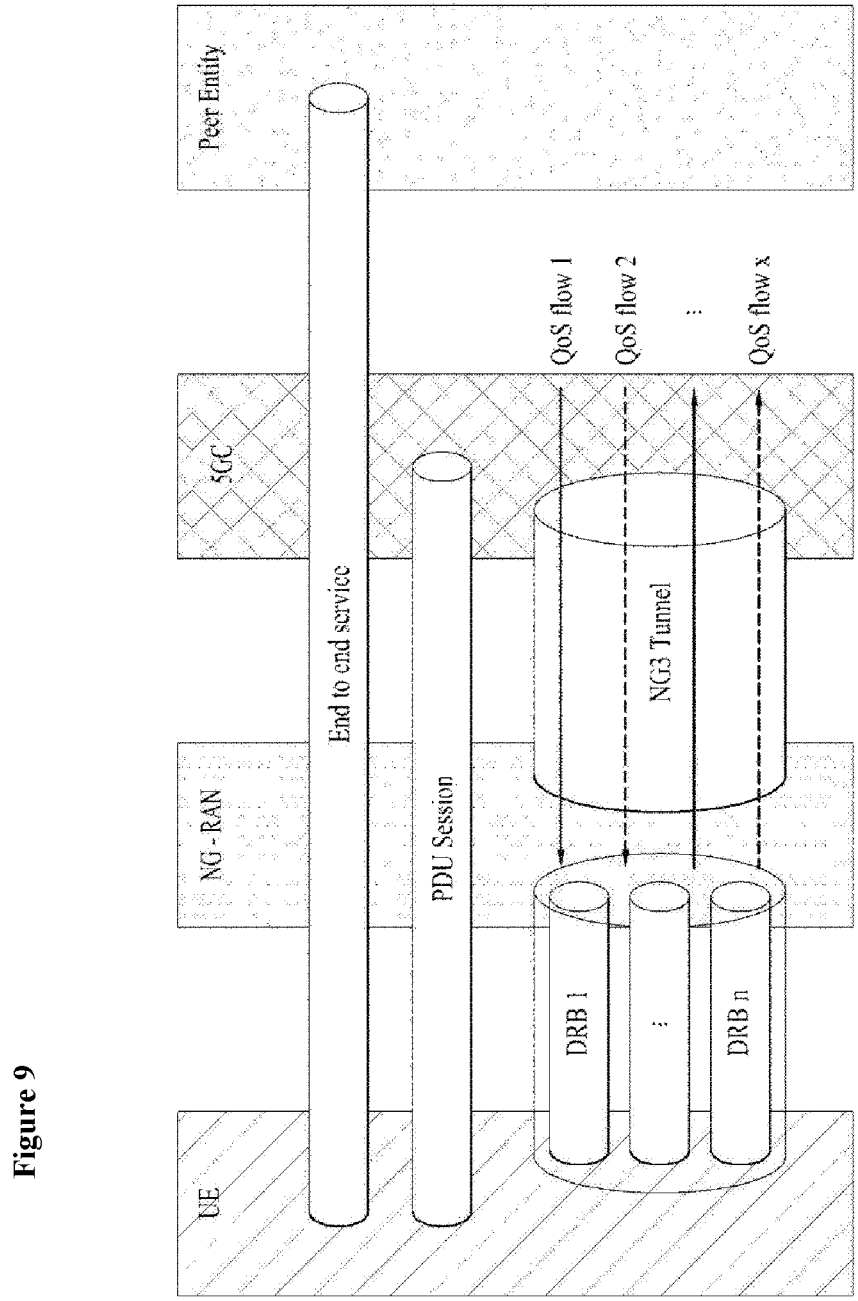
FIG. 9 is a conceptual diagram for 5G QoS model.

FIG. 9 is a diagram for QoS architecture in NR and 5GC.

For each UE, the 5GC establishes one or more PDU Sessions, and the RAN establishes one or more Data Radio Bearers per PDU Session. The RAN maps packets belonging to different PDU sessions to different DRBs. Hence, the RAN establishes at least one default DRB for each PDU Session indicated by the CN upon PDU Session establishment.

NAS level packet filters in the UE and in the 5GC associate UL and DL packets with QoS Flows, and AS-level mapping in the UE and in the RAN associate UL and DL QoS Flows with Data Radio Bearers (DRB).

5GC and RAN ensure quality of service (e.g. reliability and target delay) by mapping packets to appropriate QoS Flows and DRBs. Hence there is a 2-step mapping of IP-flows to QoS flows (NAS) and from QoS flows to DRBs (Access Stratum).

In NR, the data radio bearer (DRB) defines the packet treatment on the radio interface (Uu). A DRB serves packets with the same packet forwarding treatment. Separate DRBs may be established for QoS flows requiring different packet forwarding treatment.

In the downlink, the RAN maps QoS Flows to DRBs based on NG3 marking (QoS Flow ID) and the associated QoS profiles, and in the uplink, the UE marks uplink packets over Uu with the QoS flow ID for the purposes of marking forwarded packets to the CN.

In the uplink, the RAN may control the mapping of QoS Flows to DRB in two different ways: i) reflective mapping: for each DRB, the UE monitors the QoS flow ID(s) of the downlink packets and applies the same mapping in the uplink; that is, for a DRB, the UE maps the uplink packets belonging to the QoS flows(s) corresponding to the QoS flow ID(s) and PDU Session observed in the downlink packets for that DRB. To enable this reflective mapping, the RAN marks downlink packets over Uu with QoS flow ID. ii) Explicit Configuration: besides the reflective mapping, the RAN may configure by RRC an uplink "QoS Flow to DRB mapping*j*If an incoming UL packet matches neither an RRC configured nor a reflective "QoS Flow ID to DRB mapping", the UE shall map that packet to the default DRB of the PDU session. Within each PDU session, is up to RAN how to map multiple QoS flows to a DRB. The RAN may map a GBR flow and a non-GBR flow, or more than one GBR flow to the same DRB, but mechanisms to optimise these cases are not within the scope of standardization. The timing of establishing non-default DRB(s) between RAN and UE for QoS flow configured during establishing a PDU session can be different from the time when the PDU session is established. It is up to RAN when non-default DRBs are established.

Due to some reasons such as insufficient resources, heavy load and RRM (Radio Resource Management) policy, NG-RAN (e.g., NR gNB, NR node, evolved eNB and eLTE eNB, ng-eNB) may want to prohibit an UE from sending a part of UL packets. So, NG-RAN may take the following actions: i) to release one or more DRBs but not all the DRBs of the UE, or ii) to delete one or more QoS flows but not all QoS flows from a DRB, or iii) not to establish one or more DRBs for the UE during handover.

When the UE receives a message for initiating the above action (e.g., DRB release), the UE does not release a protocol entity of the new U-plane protocol layer which is responsible for the mapping between a QoS flow and a DRB because the protocol entity is NOT DRB specific. The UE may just delete the DRB's information stored in AS-level mapping. After that, if an UL packet matches neither an RRC configured nor a reflective "QoS Flow ID to DRB mapping", the UE maps that packet to the default DRB of the PDU session. And to conclude, the UE can still transmit UL packets of all QoS flows which were mapped to the released (or unadmitted) DRBs, or QoS flows deleted from the DRB.

Figure 10:
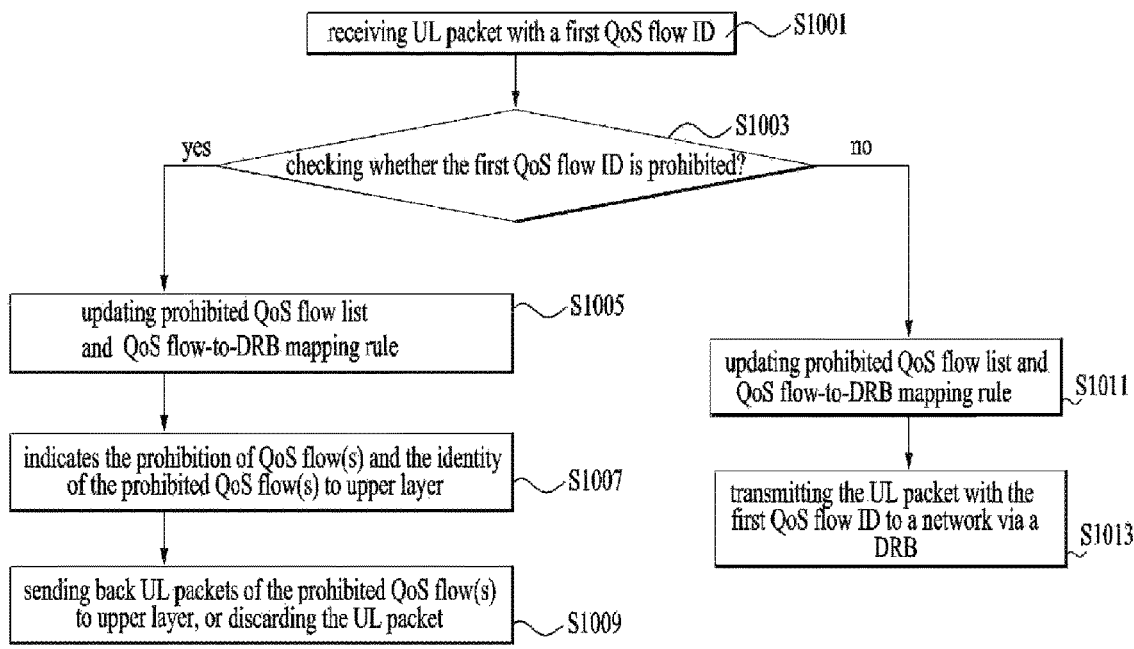
FIG. 10 is a conceptual diagram for prohibiting of transmitting uplink data packet based on QoS framework in wireless communication system according to embodiments of the present invention.

FIG. 10 is a conceptual diagram for prohibiting of transmitting uplink data packet based on QoS framework in wireless communication system according to embodiments of the present invention.

This invention relates to a method and apparatus for prohibition of UL packet transmission of one or more QoS flows. Before performing mapping between a QoS flow and a DRB, the UE checks if the QoS flow of the UL packet is prohibited. Only if it is not prohibited, the UE maps that packet to either a DRB defined by the QoS flow-to-DRB mapping rule or a default DRB, and then transmits the packet to NG-RAN via the DRB.

Some terms of this invention are defined as the followings:

PDU Session refers to association between the UE and a data network that provides a PDU connectivity service.

PDU Connectivity Service refers to a service that provides exchange of PDU (Packet Data Units) between a UE and a data network.

QoS rule refers to a set of information enabling the detection of a service data flow (e.g., IP flow) and defining its associated QoS parameters. It consists of NAS-level QoS profile (e.g., QoS characteristics, QoS marking) and Packet filters. Three types of QoS rule are Default QoS Rule, Pre-authorised QoS rule and Reflective QoS rule.

Default QoS rule refers to a mandatory QoS rule per PDU Session. It is provided at PDU Session establishment to UE.

Pre-authorised QoS rule refers to any QoS rule (different from the Default QoS rule) provided at PDU Session establishment.

Reflective QoS rule refers to the QoS rule which is created by UE based on QoS rule applied on the DL traffic. In other words, it is created and updated by NAS-level reflective QoS.

QoS marking refers to a scalar that is used as a reference to a specific packet forwarding behaviour Packet filter refers to information for matching service data flows. The format of the packet filters is a pattern for matching the IP 5 tuple (source IP address or IPv6 network prefix, destination IP address or IPv6 network prefix, source port number, destination port number, protocol ID of the protocol above IP). Service data flows are mapped to a QoS flow according to DL/UL packet filter.

QoS Flow refers to finest granularity for QoS treatment.

5GC consists of AMF (Access and Mobility Management Function), SMF (Session Management Function) and UPF (User plane Function).

AS-level mapping refers to a set of information related to the association between QoS flow and the Data Radio Bearer (DRB) transporting that QoS flow. It is configured by RRC message or AS-level reflective QoS.

AS-level reflective QoS refers to updating the UL AS mapping rule in the UE based on the DL packet with QoS flow ID received within a DRB.

NG3 refers to reference point for the user plane between NG-RAN and 5G-CN. NG-RAN can be named as NextGen (R)AN or 5G-RAN.

SDAP refer to a new U-plane protocol layer for the flow based QoS framework. PDAP can be named as SDAP.

FIG. 10 shows a diagram for setting whether UL packet transmission of QoS flow(s) is prohibited or not.

This invention may be performed in a new layer located above PDCP, called SDAP (Service Data Adaptation Protocol) layer, and the SDAP layer performs mapping between a QoS flow and a data radio bearer, or performs marking QoS flow ID in both DL and UL packets, or is applicable for connections to the 5GC, or is configured for each individual PDU session. The PDU session refers to association between the UE and a data network that provides a PDU connectivity service.

When the UE receives UL packet with a first QoS flow ID from an upper layer (S1001), the UE checks whether the first QoS flow ID is prohibited or not based on all valid QoS flow prohibition information (S1003).

Preferably, the QoS flow prohibition information is received from a NG-RAN, and the QoS flow prohibition information includes at least one followings:

Configuration #1: Configuration for indicating whether a DRB is admitted or not;

Configuration #2: Configuration for releasing one or more DRBs but not all the DRBs;

Configuration #3: Configuration for indicating whether UL packet transmission of a QoS flow is admitted or not;

Configuration #4: Configuration for deleting one or more QoS flows from a DRB;

Configuration #5: Configuration for remapping (or adding) one or more QoS flows which have been mapped to the DRB(s) to be unadmitted or released (by receiving the configuration #1 or #2);

Configuration #6: Configuration for adding one or more QoS flows, which don't match QoS flow-to-DRB mapping rule, to a DRB.

If the first QoS flow ID is prohibited, the UE updates the prohibited QoS flow list as well as the QoS flow-to-DRB mapping rule (S1005). Hereinafter, the QoS flow-to-DRB mapping rule may be replaced with an AS level mapping rule.

For example, upon reception of the QoS flow prohibition information including configuration #1 or #2, the UE sets that UL packet transmission of all QoS flows, which have been mapped to the unadmitted/released DRB(s), is not allowed. If the QoS flow prohibition information includes configuration #2 and #5, the UE sets that UL packet transmission of all QoS flows excluding the remapped QoS flow(s), which have been mapped to the released DRB(s), is not allowed.

Figure 11:
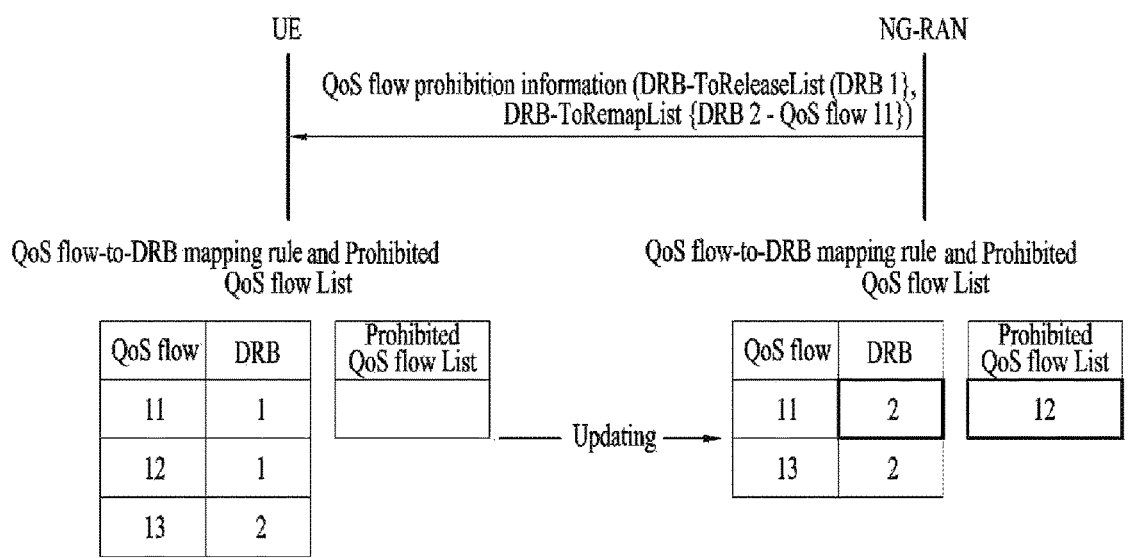
FIG. 11 is an example for updating prohibited QoS flow list and QoS flow-to-DRB mapping rule according to embodiments of the present invention.

As shown in the FIG. 11, if a first QoS flow prohibition information indicates that i) DRB 1 is released (configuration #2) and ii) the QoS flow #11, which have been mapped to the DRB 1, is re-mapped to a DBR 2 newly (configuration #5), the UE updates the prohibit QoS flow list by adding the QoS flow #12 which is mapped to the released DRB 1, and QoS flow-to-DRB mapping rule by remapping QoS flow #11 to DRB 2.

And then the UE indicates the prohibition of the first QoS flow and the identity of the prohibited QoS flow to upper layer (S1007). The UE shall not transmit the UL packets with the first QoS flow ID to a network. The UE may send back the UL packets to the upper layer, or discard the UL packets (S1009).

If the first QoS flow is not prohibited, the UE updates the prohibited QoS flow list as well as the QoS flow-to-DRB mapping rule (S1011).

If a second QoS flow prohibition information indicates that the prohibited QoS flow #12 is mapped to DRB 2 (configuration #6), the UE updates the prohibit QoS flow list by deleting the QoS flow #12, and QoS flow-to-DRB mapping rule by mapping QoS flow #12 to DRB 2. The UE transmits the UL packet with the first QoS flow ID to a network via a DRB (S1013).

In this case, if the first QoS flow ID is one of QoS flow IDs defined in UL QoS flow to DRB mapping rule configured to the UE, the DRB is a DRB mapped to the first QoS flow defined in the UL QoS flow to DRB mapping rule configured to the UE. Otherwise, if the the first QoS flow ID is not matched to any of QoS flow IDs defined in UL QoS flow to DRB mapping rule configured to the UE, the DRB is a default DRB. The default DRB is used for transmitting UL packet of which QoS flow ID is not matched to any of QoS flow IDs defined in the UL QoS flow to DRB mapping rule configured to the UE.

Figure 12:
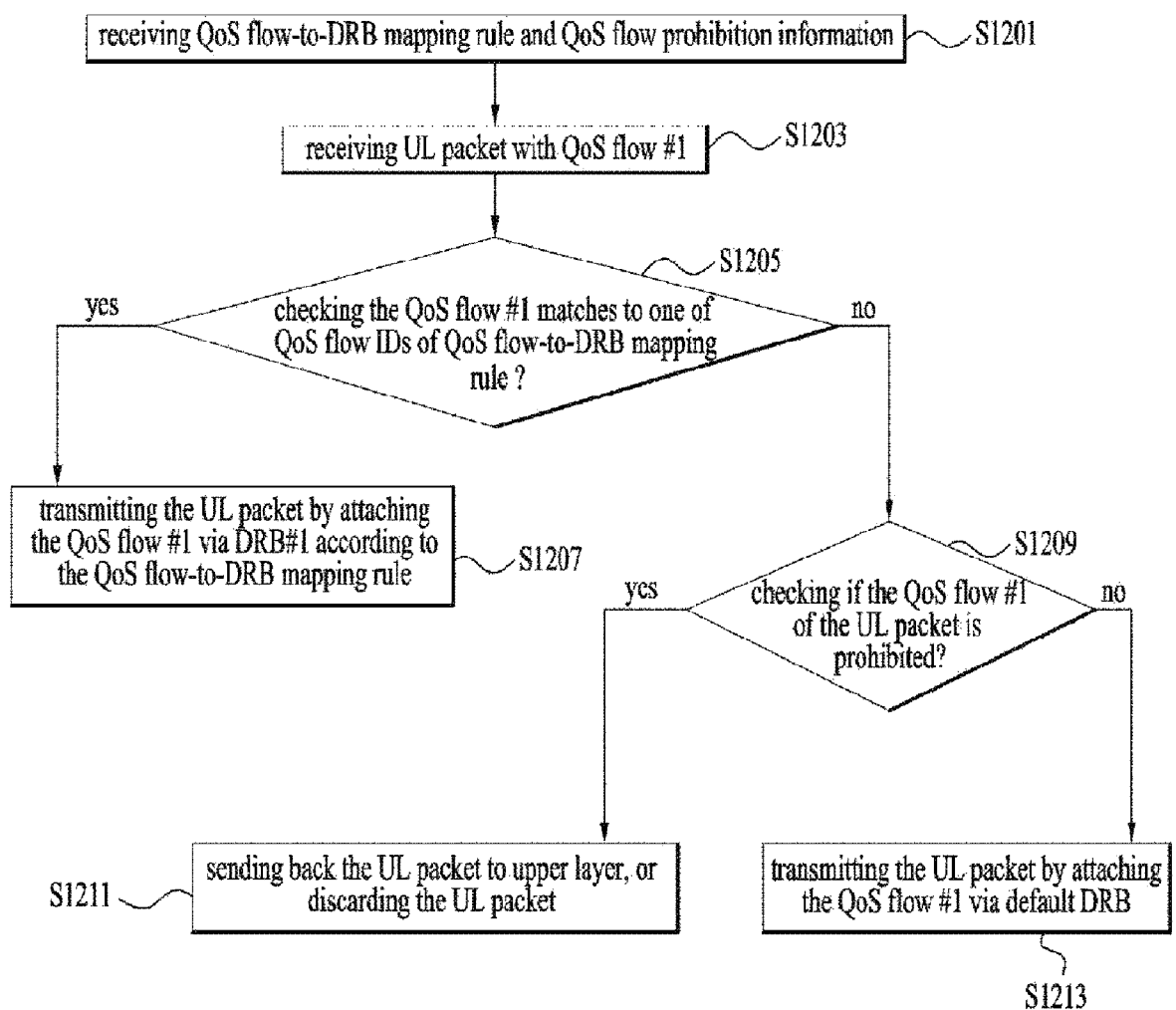
FIGS. 12 and 13 are conceptual diagrams for transmitting uplink data packet based on QoS framework in wireless communication system according to embodiments of the present invention.

FIG. 12 is a conceptual diagram for transmitting uplink data packet based on QoS framework in wireless communication system according to embodiments of the present invention.

The UE receives QoS flow and DRB mapping rule (S1201), and QoS flow prohibition information. Hereinafter, the QoS flow-to-DRB mapping rule may be replaced with an AS level mapping rule. And the QoS flow prohibition information is mentioned above.

When the UE receives UL packet with a QoS flow #1 from an upper layer (S1203), the UE checks whether the QoS flow #1 matches to one of QoS flow IDs of QoS flow-to-DRB mapping rule (S1205). That means the UE checks the UL packet matches either an RRC configured or a reflective "QoS Flow ID to DRB mapping"

If the QoS flow #1 of the UL packet matches to one of QoS flow IDs of QoS flow-to-DRB mapping rule, the UE decides to map the QoS flow #1 of the UL packet to a DRB defined by the QoS flow-to-DRB mapping rule (e.g, a DRB #1), and attaches the QoS flow #1 to the UL packet. And then the UE transmits the UL packet with the QoS flow #1 to the NG-RAN via the DRB #1 (S1207).

If the QoS flow #1 of the UL packet does not match to any one QoS flow IDs of QoS flow-to-DRB mapping rule, the UE further checks if the QoS flow #1 of the UL packet is prohibited, based on all of the valid QoS flow prohibition information received from the NG-RAN (S1209). The prohibited QoS flow list is a form of the all valid QoS flow prohibition information.

If the QoS flow #1 of the UL packet is prohibited, the UE doesn't transmit the UL packets to a network. The UE sends back the UL packet to upper layer, or discards the UL packet (S1211).

And if the QoS flow #1 of the UL packet is not prohibited, the UE maps the QoS flow #1 of the UL packet to a default DRB, and attaches the QoS Flow #1 to the UL packet. And then the UE transmits the UL packet with the QoS Flow #1 to the NG-RAN via the default DRB (S1213).

Figure 13:
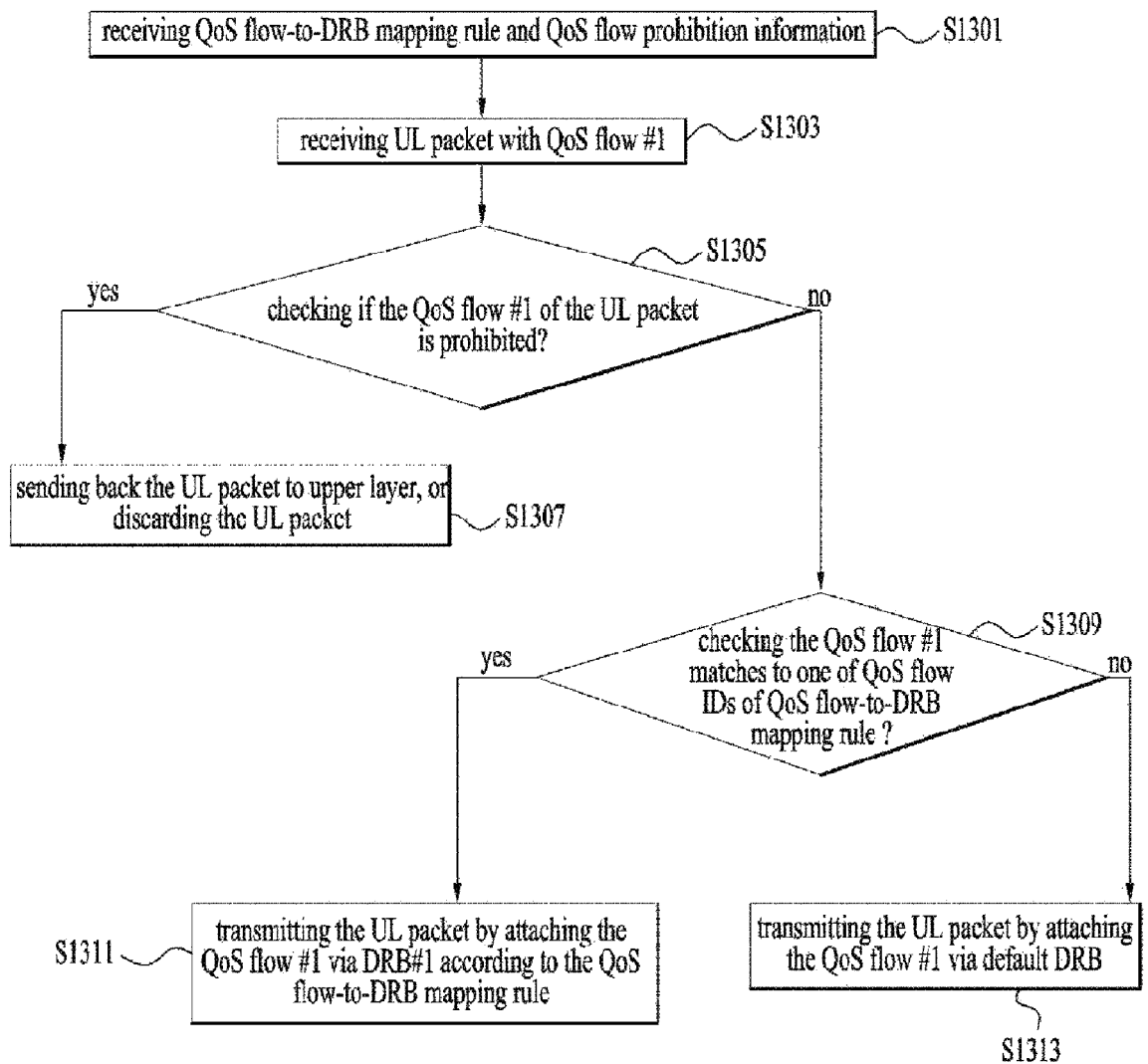

FIG. 13 is a conceptual diagram for transmitting uplink data packet based on QoS framework in wireless communication system according to embodiments of the present invention.

The UE receives QoS flow and DRB mapping rule (S1301), and QoS flow prohibition information. Hereinafter, the QoS flow-to-DRB mapping rule may be replaced with an AS level mapping rule. And the QoS flow prohibition information is mentioned above.

When the UE receives UL packet with a QoS flow #1 from an upper layer (S1303), the UE checks whether the QoS flow #1 is prohibited or not based on QoS flow prohibition information (S1305).

If the QoS flow #1 of the UL packet is prohibited, the UE doesn't transmit the UL packets to a network. The UE sends back the UL packet to upper layer, or discards the UL packet (S1307). If the QoS flow of the UL packet is not prohibited, the UE further checks whether the QoS flow #1 matches to one of QoS flow IDs of QoS flow-to-DRB mapping rule (S1309). That means the UE checks the UL packet matches either an RRC configured or a reflective "QoS Flow ID to DRB mapping".

If the QoS flow #1 of the UL packet matches to one of QoS flow IDs of QoS flow-to-DRB mapping rule, the UE decides to map the QoS flow #1 of the UL packet to a DRB defined by the QoS flow-to-DRB mapping rule (e.g, a DRB #1), and attaches the QoS flow #1 to the UL packet. And then the UE transmits the UL packet with the QoS flow #1 to the NG-RAN via the DRB #1 (S1311). If the QoS flow #1 of the UL packet does not match to any one QoS flow IDs of QoS flow-to-DRB mapping rule, the UE maps the QoS flow #1 of the UL packet to a default DRB, and attaches the QoS Flow #1 to the UL packet. And then the UE transmits the UL packet with the QoS Flow #1 to the NG-RAN via the default DRB (S1313).

Figure 14:
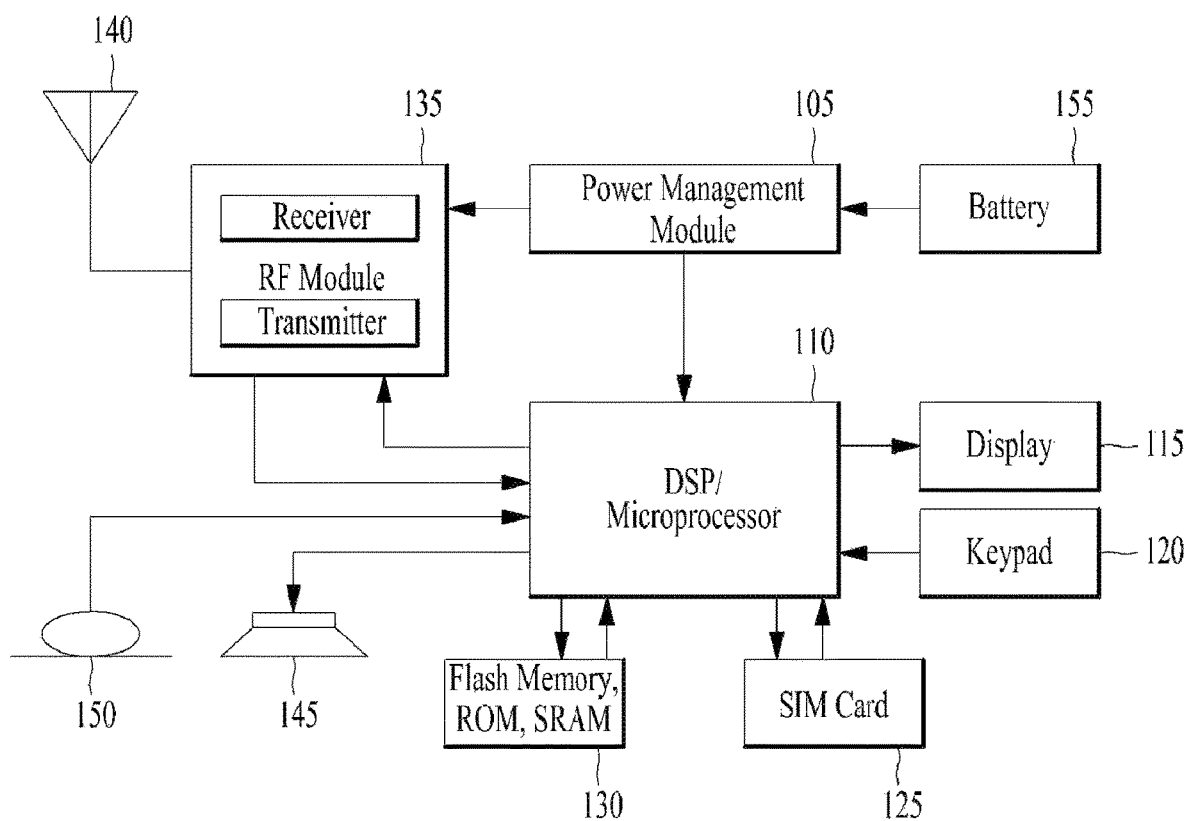
FIG. 14 is a block diagram of a communication apparatus according to an embodiment of the present invention.

FIG. 14 is a block diagram of a communication apparatus according to an embodiment of the present invention.

The apparatus shown in FIG. 14 can be a user equipment (UE) and/or eNB adapted to perform the above mechanism, but it can be any apparatus for performing the same operation.

As shown in FIG. 14, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 14 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 14 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for transmitting an uplink (UL) packet with a Quality of Service (QoS) flow identifier (ID) by a user equipment (UE) in a wireless communication system, the method comprising:
   receiving, from a network, QoS flow prohibition information including information regarding whether the QoS flow ID is prohibited;
   checking whether the first QoS flow ID is prohibited based on the QoS flow prohibition information;
   based on the QoS flow ID not being prohibited and the QoS flow ID being included in an UL QoS flow to data radio bearer (DRB) mapping rule configured to the UE, transmitting the UL packet with the QoS flow ID to the network via a DRB corresponding to the QoS flow ID in the UL QoS flow to DRB mapping rule; and
   based on the QoS flow ID not being prohibited and the QoS flow ID not being included in the UL QoS flow to DRB mapping rule, transmitting the UL packet with the QoS flow ID to the network via a default DRB,
   wherein, based on the QoS flow ID being prohibited, the UL packet is discarded without considering the UL QoS flow to DRB mapping rule.

2. The method according to claim 1,
   wherein the QoS flow prohibition information includes at least one of:
   configuration for indicating whether a DRB is admitted or not,
   configuration for releasing one or more DRBs but not all DRBs configured to the UE,
   configuration for indicating whether UL packet transmission of a QoS flow is admitted or not,
   configuration for deleting one or more QoS flow IDs from a DRB,
   configuration for re-mappaing one or more QoS flow IDs which have been mapped to DRBs to be released, or
   configuration for adding one or more QoS flow IDs which are not matched to any of QoS flow IDs defined in the UL QoS flow to DRB mapping rule.

3. The method according to claim 1, wherein, based on the QoS flow prohibition information indicating a DRB which is to be released, all QoS flow IDs corresponding to the DRB which is to be released are prohibited.

4. The method according to claim 1, wherein, based on the QoS flow prohibition information indicating a DRB which is to be released and new configuration for remapping one or more QoS flows which have been mapped to the released DRB, all QoS flows excluding the remapped QoS flows are prohibited.

5. The method according to claim 1, wherein the QoS flow prohibition information is for a service data adaptation protocol (SDAP) layer which is an upper layer of a packet data convergence protocol (PDCP) layer of the UE.

6. A user equipment (UE) operating in a wireless communication system, the UE comprising:
   a Radio Frequency (RF) module; and
   a processor operably coupled to the RF module and configured to:
   receive, from a network, Quality of Service (QoS) flow prohibition information including information regarding whether a QoS flow identifier (ID) is prohibited,
   based on the QoS flow prohibition information, check whether the QoS flow ID to be transmitted with an uplink (UL) packet is prohibited,
   based on the QoS flow ID not being prohibited and the QoS flow ID being included in an UL QoS flow to data radio bearer (DRB) mapping rule configured to the UE, transmit the UL packet with the QoS flow ID to the network via a DRB corresponding to the QoS flow ID in the UL QoS flow to DRB mapping rule; and
   based on the QoS flow ID not being prohibited and the QoS flow ID not being included in the UL QoS flow to DRB mapping rule, transmit the UL packet with the QoS flow ID to the network via a default DRB,
   wherein, based on the QoS flow ID being prohibited, the UL packet is discarded without considering the UL QoS flow to DRB mapping rule.

7. The UE according to claim 6,
   wherein the QoS flow prohibition information includes at least one of:
   configuration for indicating whether a DRB is admitted or not,
   configuration for releasing one or more DRBs but not all DRBs configured to the UE,
   configuration for indicating whether UL packet transmission of a QoS flow is admitted or not,
   configuration for deleting one or more QoS flow IDs from a DRB,
   configuration for re-mappaing one or more QoS flow IDs which have been mapped to DRBs to be released, or
   configuration for adding one or more QoS flow IDs which are not matched to any of QoS flow IDs defined in the UL QoS flow to DRB mapping rule.

8. The UE according to claim 6, wherein, based on the QoS flow prohibition information indicating a DRB which is to be released, all QoS flow IDs corresponding to the DRBs which is to be released are prohibited.

9. The UE according to claim 6, wherein, based on the QoS flow prohibition information indicating a DRB which is to be released and new configuration for remapping one or more QoS flows which have been mapped to the released DRB, all QoS flows excluding the remapped QoS flows are prohibited.

10. The UE according to claim 6, wherein the QoS flow prohibition information is for a service data adaptation protocol (SDAP) layer which is an upper layer of a packet data convergence protocol (PDCP) layer of the UE.

\* \* \* \* \*